(12) United States Patent
Raillard et al.

(10) Patent No.: US 11,931,963 B2
(45) Date of Patent: Mar. 19, 2024

(54) METHOD FOR PRODUCING A THREE-DIMENSIONAL ELEMENT ON A TIMEPIECE COMPONENT

(71) Applicant: ETA SA Manufacture Horlogere Suisse, Grenchen (CH)

(72) Inventors: Brice Raillard, Bienne (CH); Vlada Mihailovic, Burgaeschi (CH); Felix Jaeggi, Bienne (CH); Christophe Emmenegger, Ecuvillens (CH); Frederic Jeanrenaud, La Chaux-de-Fonds (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 870 days.

(21) Appl. No.: 16/771,462

(22) PCT Filed: Dec. 6, 2018

(86) PCT No.: PCT/EP2018/083718
§ 371 (c)(1),
(2) Date: Jun. 10, 2020

(87) PCT Pub. No.: WO2019/121028
PCT Pub. Date: Jun. 27, 2019

(65) Prior Publication Data
US 2021/0370605 A1     Dec. 2, 2021

(30) Foreign Application Priority Data

Dec. 20, 2017   (EP) .................................... 17209106

(51) Int. Cl.
*B29C 64/112*     (2017.01)
*B29C 64/386*     (2017.01)
(Continued)

(52) U.S. Cl.
CPC .......... *B29C 64/386* (2017.08); *B29C 64/112* (2017.08); *G04B 19/12* (2013.01);
(Continued)

(58) Field of Classification Search
CPC ... B29C 64/112; B29C 64/264; B29C 64/336; B29C 64/386; B29C 64/393;
(Continued)

(56) References Cited

U.S. PATENT DOCUMENTS 5,344,298 A * 9/1994 Hull ........................ G09B 25/00
                                                        118/712
5,750,241 A * 5/1998 Kobayashi ................ B44C 1/24
                                                        428/209
(Continued)

FOREIGN PATENT DOCUMENTS

CN         1394301 A      1/2003
CN       101665040 A      3/2010
(Continued)

OTHER PUBLICATIONS

Notice of Grounds for Rejection dated Feb. 25, 2023 in Korean Patent Application No. 10-2022-7003959 (with English language translation), 10 pages.
(Continued)

*Primary Examiner* — Monica A Huson
*Assistant Examiner* — Kelsey C Grace
(74) *Attorney, Agent, or Firm* — Oblon, McClelland, Maier & Neustadt, L.L.P.

(57) ABSTRACT

A method for producing a three-dimensional element on a timepiece component, in particular on a dial, that includes generating, by means of a control unit, at least one control instruction for a printing device for reproducing a reference digital graphical representation relating to said three-dimensional element, and constructing, by means of the printing
(Continued)

device, at least two substantially superimposed or superimposed layers each having at least one particle which is printed on the timepiece component and which forms the three-dimensional element.

15 Claims, 3 Drawing Sheets

(51) Int. Cl.
*G04B 19/12* (2006.01)
*G04B 45/00* (2006.01)
*B33Y 10/00* (2015.01)
*B33Y 50/02* (2015.01)
*B33Y 70/00* (2020.01)
*B33Y 80/00* (2015.01)

(52) U.S. Cl.
CPC ..... *G04B 45/0015* (2013.01); *G04B 45/0076* (2013.01); *B33Y 10/00* (2014.12); *B33Y 50/02* (2014.12); *B33Y 70/00* (2014.12); *B33Y 80/00* (2014.12)

(58) Field of Classification Search
CPC ......... B33Y 10/00; B33Y 30/00; B33Y 40/00; B33Y 50/02; B33Y 70/00; B33Y 80/00; G04B 19/12; G04B 45/0015; G04B 45/0076
See application file for complete search history.

(56) References Cited

U.S. PATENT DOCUMENTS

| | | | |
|---|---|---|---|
| 2010/0055484 | A1 | 3/2010 | Chretien et al. |
| 2011/0285778 | A1 | 11/2011 | Ishikawa et al. |
| 2014/0152383 | A1 | 6/2014 | Nikonov et al. |
| 2016/0082653 | A1 | 3/2016 | Ohnishi |
| 2017/0129052 | A1 | 5/2017 | Buller et al. |
| 2018/0001569 | A1 | 1/2018 | Garcia Reyero Vinas et al. |
| 2018/0001681 | A1 | 1/2018 | Morovic et al. |
| 2018/0079923 | A1 | 3/2018 | Umebayashi |
| 2018/0229426 | A1 | 8/2018 | Douroumis et al. |
| 2018/0361655 | A1 | 12/2018 | Chen et al. |

FOREIGN PATENT DOCUMENTS

| | | | |
|---|---|---|---|
| CN | 103909655 | A | 7/2014 |
| CN | 104756255 | A | 7/2015 |
| CN | 104859277 | A | 8/2015 |
| CN | 105027690 | A | 11/2015 |
| CN | 205003448 | U | 1/2016 |
| CN | 105722608 | A | 6/2016 |
| CN | 106394104 | A | 2/2017 |
| CN | 107209499 | A | 9/2017 |
| CN | 107209500 | A | 9/2017 |
| CN | 107209647 | A | 9/2017 |
| CN | 107344421 | A | 11/2017 |
| EP | 3 002 107 | A1 | 4/2016 |
| JP | 2006-29857 | A | 2/2006 |
| JP | 2008-518290 | A | 5/2008 |
| JP | 2010-58510 | A | 3/2010 |
| JP | 2015-16680 | A | 1/2015 |
| JP | 2016-87978 | A | 5/2016 |
| JP | 2017-104058 | A | 6/2017 |
| JP | 2017-526815 | A | 9/2017 |
| JP | 2017-194728 | A | 10/2017 |
| WO | WO 01/15123 | A1 | 3/2001 |
| WO | WO 2006/045178 | A1 | 5/2006 |
| WO | WO 2016/011290 | A1 | 1/2016 |
| WO | WO 2016/116748 | A1 | 7/2016 |
| WO | WO 2016/199611 | A1 | 12/2016 |
| WO | WO 2016/203063 | A1 | 12/2016 |

OTHER PUBLICATIONS

Korean Office Action dated Apr. 1, 2021 in Korean Patent Application No. 10-2020-7017727 (with English translation), 13 pages.
Korean Office Action dated Oct. 27, 2021 in Korean Patent Application No. 10-2020-7017727 (with English translation), 9 pages.
Japanese Office Action dated Oct. 26, 2021 in Japanese Patent Application No. 2020552112 (with English translation), 8 pages.
Final Decision of Rejection dated Mar. 15, 2022 in Japanese Patent Application No. 2020-552112 (with English language translation), 8 pages.
Combined Chinese Office Action and Search Report dated Mar. 16, 2022 in Patent Application No. 201880082973.0 (with English translation of Category of Cited Documents), 8 pages.
Notice of the Reason for Refusal dated Jul. 6, 2021 in Japanese Patent Application No. 2020-552112 (with English language translation), 10 pages.
Combined Chinese Office Action and Search Report dated Feb. 3, 2021 in Chinese Patent Application No. 20188008297.0 (with English translation of Office Action), 15 pages.
International Search Report dated Mar. 19, 2019 in PCT/EP2018/083718 filed Dec. 6, 2018, 2 Pages.
"Techniques, technologies et procédés d'impression 3D," Sculpteo, Retrieved from the Internet [URL: https://www.sculpteo.com/fr/impression-3d/technologies-dimpression-3d/], XP055480603, Jul. 11, 2017, 7 Pages.
Combined Chinese Office Action and Search Report dated Sep. 30, 2022 in Chinese Patent Application No. 201880082973.0 (with English translation), 20 pages.
Japanese Office Action dated Oct. 10, 2023 in Japanese Patent Application No. 2022-113800 (with English translation), 10 pages.
Office Action dated Aug. 24, 2023, in corresponding Korean Patent Application No. 10-2022-7003959 (with English Translation), 6 pages.

* cited by examiner

METHOD FOR PRODUCING A THREE-DIMENSIONAL ELEMENT ON A TIMEPIECE COMPONENT

TECHNICAL FIELD

The present invention relates to a method for producing a three-dimensional element on a timepiece component and a system implementing such a method.

The invention further relates to a timepiece component comprising such a three-dimensional element in addition to a timepiece provided with this component.

The present invention further relates to a computer program.

PRIOR ART

Timepiece components such as timepiece dials are generally planar, the sole three-dimensional elements whereof are appliques such as the numbers of the hours as well as indexes disposed at regular intervals around the periphery of these dials in order to ease the reading of the time relative to the angular position of the hands. The production of appliques and indexes remains a complex procedure and the placement thereof on a dial is a tedious operation.

Nonetheless, various methods exist for producing three-dimensional elements on dials with the advantage of overcoming the aforementioned drawbacks.

More specifically, European patent No. 2370865 discloses a solution which consists of producing a mask on a dial of a timepiece, the thickness whereof corresponding to the desired thickness of the three-dimensional elements intended to decorate this dial, and having at least one opening. This mask is then placed against the dial with the opening disposed at the location of the part of the dial to be decorated so as to fill, by hot working, the opening of the mask with a material that is at least partially amorphous. Finally, the mask is removed in order to obtain the three-dimensional element on the dial of this timepiece.

However, such a solution is relatively complex to perform as a result of the high number of operations required for the implementation thereof and the different types of tooling required.

SUMMARY OF THE INVENTION

One purpose of the present invention is thus to propose a method for producing a three-dimensional element such as a decorative element or a raised pattern on a timepiece component in a fast and simple manner and which further contributes to improving the large-scale, automated, and cost-effective production of timepiece components provided with such three-dimensional elements.

In this respect, the invention relates to a method for producing a three-dimensional element on a timepiece component, in particular on a dial, comprising the following steps of:
generating, by means of a control unit, at least one control command for a printing device for reproducing a reference digital graphical representation relating to said three-dimensional element, and
constructing, by means of the printing device, at least two substantially superimposed or superimposed layers each comprising at least one particle which is printed on the timepiece component and which forms the three-dimensional element.

Thus, by virtue of these features, the production method allows a three-dimensional element to be built on a timepiece component by way of a reduced number of operations which are easy and fast to implement.

In other embodiments:
the construction step comprises, for each layer of at least one printed particle, a sub-step of applying a layer of at least one particle on the timepiece component and a sub-step of treating said layer of at least one particle;
the application sub-step provides for having the control unit execute said at least one control command comprising data describing layers constituting said reference digital graphical representation to be reproduced;
the application sub-step provides for depositing at least one ink comprising said at least one particle;
the ink comprises a fluid carrying said at least one particle, the fluid being chosen from among a solvent, a viscoelastic polymer, an oil, water and/or an aqueous solution;
the sub-step of treating the layer of at least one particle comprises a phase of fixing said layer of at least one functional particle on the timepiece component;
the fixing phase provides for exposing the layer of at least one particle to an airflow, in particular a hot airflow and/or to light radiation, in particular ultraviolet (UV) radiation or infrared radiation;
said at least one particle is included in an ink such as a coloured ink comprising at least one pigmented or coloured particle;
said at least one particle is included in an ink such as a colourless or transparent or translucent ink comprising at least one colourless or transparent or translucent particle;
said at least one particle is included in an ink such as a functional ink comprising at least one functional particle;
the treatment sub-step contributes to obtaining the three-dimensional element on a timepiece component formed of at least two layers, each having at least one substantially superimposed or superimposed printed particle; and
the three-dimensional element produced has a thickness of greater than or substantially greater than 100 microns.

The invention further relates to a timepiece component, in particular a dial comprising at least one three-dimensional element capable of being obtained using such a method.

The invention further relates to a timepiece having at least one such timepiece component.

The invention further relates to a system for producing a three-dimensional element on a timepiece component implementing such a method, the system comprising a printing device and a control unit, said printing device being connected to said control unit.

Advantageously, the control unit comprises hardware and software resources, said hardware resources comprising memory elements having at least one reference three-dimensional graphical representation to be produced on a timepiece component and descriptive data relating to said at least one reference three-dimensional graphical representation.

The invention further relates to a computer program comprising program code instructions for executing the steps of this method when said program is executed by a control unit.

BRIEF DESCRIPTION OF THE FIGURES

Other features and advantages of the present invention will appear after reading the plurality of embodiments, which are provided for purposes of illustration only and not intended to limit the scope of the invention, given with reference to the accompanying drawings, wherein.

DETAILED DESCRIPTION OF THE INVENTION

Figure 1:
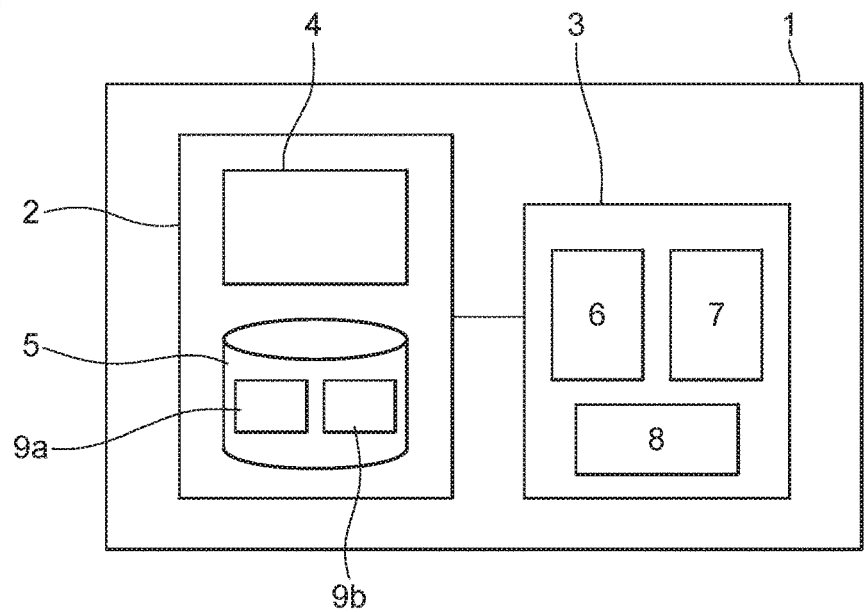
FIG. 1 is a diagrammatic view of a system for producing a three-dimensional element on a timepiece component, according to one embodiment of the invention.

With reference to FIG. 1, the system 1 for producing a three-dimensional element 20 on a timepiece component 10 of a timepiece 30 comprises a control unit 2 and a printing device 3. In other words, the invention consists not of manufacturing the timepiece component 10, but of constructing a three-dimensional element 20 on this component 10. The timepiece component 10 can be a dial for example. This timepiece component 10 can also be a substrate intended to form such a component 10. Such a timepiece component 10 designed to receive the three-dimensional element 20 can be made of a different material from that of this three-dimensional element 20. This timepiece component 10 can, for example, be obtained by machining or even by moulding. The three-dimensional element 20 on this timepiece component 10 can be coloured, multicoloured, monochromatic, transparent or translucent and comprise, for example, a decorative element or a pattern having a raised portion such as an index or an applique capable, for example, of playing a part in indicating a piece of information such as the date or time.

It should be noted that the three-dimensional element 20 is formed by at least two layers applied onto the timepiece component, the layers being substantially superimposed or superimposed and each comprising at least one particle which is thus, in this case, printed on said timepiece component 10. This particle, otherwise referred to as a "usable particle" or a "characterising particle" is that which characterises the corresponding layer as regards at least one of the features of this layer, for example the nature thereof, the texture thereof, the character thereof, the colour thereof, the shade thereof, and/or the function thereof, etc.

In this system 1, the control unit 2 is connected to the printing device 3 in particular to ensure control of this device 3. The control unit 2 can be a computer or even a microcontroller by comprising hardware and software resources, in particular at least one processor 4 cooperating with memory elements 5. This control unit 2 is capable of executing commands to implement a computer program.

In this control unit 2, the memory elements 5 comprise, in addition to the computer program, data relating to at least one reference digital graphical representation 9a capable of being reproduced on the timepiece component 10 in order to build the three-dimensional element 20, in addition to descriptive data 9b relating to said at least one reference digital graphical representation 9a. This reference digital graphical representation 9a can comprise a reference two-dimensional graphical representation or a reference three-dimensional graphical representation. It should be noted that the reference digital graphical representation 9a is generated by a design module of the system 1 which is connected to the control unit 2 capable of comprising a three-dimensional digital imaging device or even by a software tool executed by the control unit 2 allowing for virtual 3D modelling from photographs or images, or even allowing a virtual three-dimensional digital object to be designed (for example a computer-aided design software more commonly known as CAD software).

Such a printing device 3 comprises a printing member 6, a fixing member 7 and a drive member 8. The printing member 6 comprises a plurality of printing entities, in particular inkjet cartridges, each entity comprising a printhead and at least one reservoir 12a to 12f. In the present embodiment, each cartridge comprises at least one inkjet printhead 12a to 12f. In these cartridges, the ink has at least one particle that can be comprised in a fluid. Such a fluid is provided to ensure the carriage of said at least one particle on the support on which it must be deposited, in this case the timepiece component 10, during the ejection thereof from the printhead. Such a fluid can be any body capable of ensuring this carriage. This fluid can be chosen, in a non-limiting and non-exhaustive manner, from a solvent, a viscoelastic polymer, an oil, water and an aqueous solution. For the purposes of illustration, when this is a viscoelastic polymer, this fluid is a viscoelastic polymer fluid in the liquid phase which is non-polymerised and which is preferably capable of photopolymerisation. It should be noted that, in an alternative embodiment, said at least one particle can be deposited on this support without requiring such a fluid for ensuring the carriage thereof. The cartridges of this printing member 6 can comprise inks such as:
- a coloured ink having at least one pigmented or coloured particle, or
- a colourless or transparent or translucent ink, such as a lacquer, having at least one colourless or transparent or translucent particle, or
- a functional ink having at least one functional particle and which is selected from the group formed of an electroluminescent ink, a phosphorescent ink, photoluminescent ink, a conductive ink, a semiconductive ink, an electroactive ink, a magnetic ink, a photochromic ink, an electrochromic ink, a thermochromic ink, an ionochromic ink and a mechanochromic ink.

In this context, a layer formed by at least one functional particle and/or by at least one coloured or pigmented particle, and/or by at least one colourless or transparent or translucent particle, can have, in a non-exhaustive and non-limiting manner:
- a white colour only;
- a white colour having a matt or gloss finish due to the presence of at least one colourless or transparent or translucent particle;
- a black colour only;

a black colour having a matt or gloss finish due to the presence of at least one colourless or transparent or translucent particle;

a wide variety of colours owing to the four-colour printing technique which implements primary colours such as cyan, magenta, yellow and black (referred to as the CMYK system), allowing this wide variety of colours to be reproduced from three elementary colours, a blue-green referred to as cyan, a red referred to as magenta and a yellow, to which colours the colour black is added.

In addition, such a printing device 3 is furthermore capable of contributing to the production of a three-dimensional element 20 on the timepiece component 10 at a low resolution or even at a high resolution that can be greater than or equal to 2,400 dpi (pixels per inch).

In this printing device 3, the drive member 8 is capable of causing the printing member 6 to move in various directions relative to a support element of the system 1 on which the timepiece component 10 can be disposed. This support element, which is capable of passing the timepiece component 10 in front of the printheads 12a to 12f, can comprise a removable connecting element for the timepiece component 10, for example an adhesive element. The fixing member 7 is provided to ensure the fixing of a layer of at least one particle to the support, in this case the timepiece component or to a first layer or an initial layer already present on this timepiece component 10. This fixing member 7 comprises a module that is capable of emitting ultraviolet UV radiation and/or infrared radiation and/or an airflow, in particular a hot airflow. This module is capable of generating radiation or an airflow over all or part of an assembly area of a surface of the timepiece component 10 on which the three-dimensional element 20 can be built. It should be noted that when the different inks mentioned above comprise a viscoelastic polymer fluid, the module is a photopolymerisation module provided with an ultraviolet UV radiation source and which is therefore capable of generating UV radiation over all or part of the assembly area of the surface of the timepiece component 10 on which the three-dimensional element 20 can be built.

Figure 2:
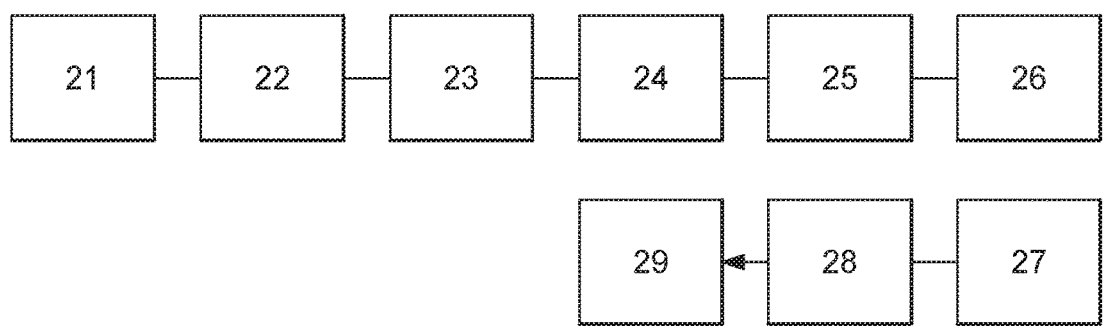
FIG. 2 is a flow chart relating to a method for producing a three-dimensional element on a timepiece component, according to the embodiment of the invention.
Figure 3:
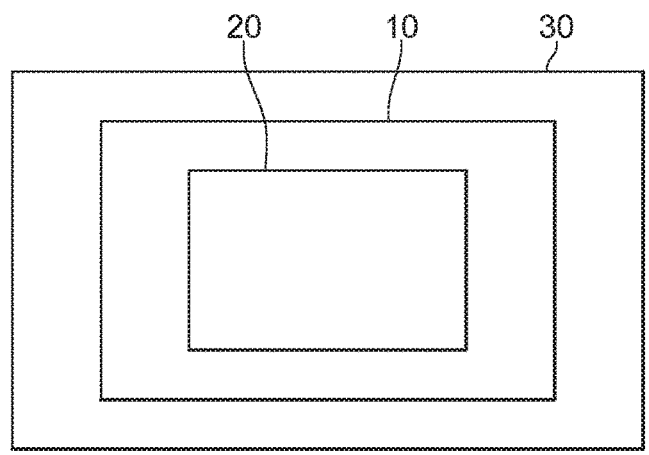
FIG. 3 is a diagrammatic view of a timepiece comprising a timepiece component provided with at least one three-dimensional element, according to the embodiment of the invention.

Such a system 1 is capable of implementing a method for producing the three-dimensional element 20 on a timepiece component 10 shown in FIG. 2.

This method comprises a step 21 of generating at least one reference digital graphical representation 9a. During this step 21, this reference digital graphical representation 9a can be produced from a three-dimensional digital imaging, or when the control unit 2 executes a 3D virtual modelling software or software for designing a three-dimensional virtual digital object (for example a computer-aided design software, more commonly referred to under the acronym CAD). Once generated, this reference digital graphical representation 9a is archived in the format of a digital data file in the memory elements 5 of the control unit 2. In other words, such a file comprises information data relating to the reference digital graphical representation 9a.

The method then provides for a step 22 of determining descriptive data 9b relating to said reference three-dimensional graphical representation 9a. Such a step 22 is implemented by the control unit 2 and thus allows descriptive data 9b to be determined, which data contributes in particular to selecting the one or more types of ink required to produce the three-dimensional element 20 on the timepiece component 10 as well as the direction of movement of the printing member 6. During this step 22, this file and in particular the information data relating to the reference digital graphical representation 9a are processed, in particular by implementing a process for digitally dividing/cutting this graphical representation 9a into at least two layers in a:

transverse direction that can be horizontal, vertical or oblique;

longitudinal direction that can be horizontal, vertical or oblique.

More specifically, during this processing, the control unit 2 determines elements that are characteristic of each layer obtained, such as:

at least one dimension of each layer, which can be, for example, for each layer, a thickness, length, width, surface area, or volume, etc.;

visual/aesthetic/structural aspects, i.e. visual and/or aesthetic and/or structural aspects of each layer of the reference three-dimensional graphical representation 9a such as colour and/or texture, etc.;

physical and/or chemical functional characteristics that the three-dimensional element 20 must have and which are, for example, related to:

electrical conductivity, semiconductive or insulating nature;

semiconductivity;

electroluminescence;

photoluminescence (for example a reaction to ultraviolet radiation);

phosphorescence;

"X-chromism" (photochromic, electrochromic, thermochromic, ionochromic, mechanochromic, etc.);

electroactivation;

magnetism;

etc.

These characteristic elements of each layer constitute the descriptive data 9b relating to the reference three-dimensional graphical representation 9a that are archived in the memory elements 5 of the control unit 2.

The method for producing this three-dimensional element 20 further comprises a step 23 of arranging the timepiece component 10 on the support element of the system 1. It further comprises a step 24 of selecting the reference three-dimensional graphical representation 9a that must be reproduced on the timepiece component 10 in order to form the three-dimensional element 20. During this selection step 24, this reference three-dimensional graphical representation 9a can thus be selected using a man-machine interface (MMI) connected to the control unit 2. It should be noted that this step 24 can be implemented either before or after the arrangement step 23.

This method further comprises a step 25 of treating the surface of the timepiece component 10, in particular in the assembly area of this surface on which the three-dimensional element 20 will be produced. This treatment step 25 can be implemented either before or after one or the other of the generation step 21, determination step 22, arrangement step 23 or selection step 24. Such a treatment step 25 can be carried out by implementing atmospheric plasma, low-pressure plasma, flame, electric corona discharge, organic layer deposition, cleaning bath or galvanic treatment technologies, treatment technologies using adhesion primer or a combination of one or the other or of a plurality of these technologies. Such a step 25 may or may not be carried out under a vacuum. Moreover, it should be noted that this treatment step 25 contributes to ensuring good adhesion between the surface of the timepiece component 10 and the three-dimensional element 20 produced on the timepiece component 10, in particular between a first so-called initial layer that makes up this three-dimensional element 20 and this surface, which is described hereinafter.

The method then provides for a step 26 of generating, by means of the control unit 2, at least one control command for controlling the printing device 3, said at least one command being intended to reproduce the reference digital graphical representation 9a. This step 26 of generating said at least one control command is carried out on the basis of the descriptive data 9b relating to the layers forming the reference digital graphical representation 9a to be reproduced. Said at least one command comprises criteria for controlling the printing device 3 and in particular the printing member 6 and the fixing member 7. These criteria in particular comprise data relating to:

- a selection of cartridges comprising the printheads 12a to 12f required for reproducing each layer of the reference digital graphical representation 9a and, depending on the ink that they contain, in particular for reproducing the visual/aesthetic/structural aspects and/or the functional characteristics of each of these layers;
- a movement of the printhead 12a to 12f of each cartridge relative to the assembly area of the surface of the timepiece component 10 for reproducing at least one dimension and/or the visual/aesthetic/structural aspects and/or the functional characteristics of each layer of the reference digital graphical representation 9a;
- a distance and/or positioning of the printhead 12a to 12f of each cartridge relative to the assembly area of the surface of the timepiece component 10 for reproducing at least one dimension and/or the visual/aesthetic/structural aspects and/or the functional characteristics of each layer of the reference digital graphical representation 9a;
- a duration of the positioning of the printhead 12a to 12f of each cartridge relative to the assembly area of the surface of the timepiece component 10 for reproducing at least one dimension and/or the visual/aesthetic/structural aspects and/or the functional characteristics of each layer of the reference three-dimensional graphical representation 9a;
- an ink flow ejected from the printheads 12a to 12f, in particular the number of droplets ejected for reproducing at least one dimension and/or the visual/aesthetic/structural aspects and/or the functional characteristics of each layer of the reference three-dimensional graphical representation 9a.

The method subsequently comprises a step 27 of constructing, by means of the printing device 3, at least two substantially superimposed or superimposed layers each having at least one particle which is printed on the surface of the timepiece component 10 and which forms the three-dimensional element 20. Such a step 27 can also be referred to as a "construction step 27 using a jet at least containing particles". More specifically, during this step 27, the particles are sprayed onto the timepiece component 10. These particles can be included in the same nozzle or in a plurality of different nozzles of the printhead. It should thus be noted that, as stated hereinabove, the particle can be deposited on the timepiece component 10 by being included in a fluid or in an alternative embodiment without the need for such a fluid to ensure the carriage thereof.

Said at least one printed particle is included in one of the aforementioned functional, coloured and/or colourless/transparent/translucent inks. More specifically, it should be noted that a layer can be formed solely from at least one printed particle type or from a plurality of particle types, i.e. functional, coloured and/or colourless/transparent/translucent printed particles.

This construction step 27 comprises, for each layer of at least one printed particle built on the timepiece component 10, two sub-steps 28, 29. The first sub-step is a sub-step 28 of applying a layer of at least one particle onto this timepiece component 10 in particular onto the assembly area of the surface of this component 10. This application of the layer can be carried out continuously or selectively. As mentioned above, said at least one particle can be a functional, coloured and/or colourless/transparent/translucent particle. It is understood that this layer can comprise a plurality of particle types, in addition to said at least one particle, selected from functional, coloured or colourless/translucent/transparent particles. Moreover, this application sub-step 28 provides for having the control unit 2 execute said at least one control command comprising data describing said reference three-dimensional graphical representation 9a to be reproduced. The execution of said at least one command enables, within the scope of the application of this layer, control over the deposition of at least one ink comprising said at least one particle and optionally other inks comprising at least one functional, coloured or colourless/translucent/transparent particle. The second sub-step is a sub-step 29 of treating said layer of at least one particle, which directly follows the application sub-step 28, and which is intended to finalise the printing of said at least one particle of this layer on the timepiece component 10. This sub-step 29 of treating the layer of at least one functional particle comprises a phase of fixing said layer of at least one particle onto the timepiece component 10. This fixing phase provides for exposing the layer of at least one particle to an airflow, in particular a hot airflow and/or to light radiation, in particular to ultraviolet (UV) radiation or infrared radiation. The purpose of this fixing phase is thus to transform the layer of at least one particle that is in a paste or liquid state into a layer of at least one printed particle that is in a solid, rigid, resilient, dry, cured and/or infusible state. It should be noted that such a transformation has the advantage of being carried out very quickly, generally in less than one second.

In one example wherein the particle is included in a viscoelastic polymer ink, i.e. an ink comprising a viscoelastic polymer fluid capable of carrying and/or of fixing/binding said at least one particle, the construction step 27 provides for an application sub-step 28 wherein the control unit 2 executes said at least one control command comprising data 9b describing said reference three-dimensional graphical representation 9a to be reproduced. The printing device 3 subsequently applies a layer of at least one particle directly onto the assembly area of the surface provided for this purpose on the timepiece component 10 according to said at least one executed control command. This layer comprises an ink having said at least one particle carried by a viscoelastic polymer fluid; in this context, this ink is also referred to as a viscoelastic polymer ink. This viscoelastic polymer ink layer is otherwise referred to as the initial layer or first layer. This first layer and thus the one or more particles constituting same is then subjected to polymerisation during the sub-step 29 of treating this layer. More specifically, this sub-step 29 comprises a phase of fixing said layer onto the assembly area. During this phase, said layer is photopolymerised by being exposed to light radiation, in particular to ultraviolet UV radiation emitted by the fixing member 7 and which is intended to transform same into an acrylate polymer ink layer, also referred to as a polymerised viscoelastic polymer ink layer. It should be noted that this polymerised viscoelastic polymer ink can also be referred to as a photo-cured polymer ink or as a photopolymerised polymer ink. The printing device 3 can subsequently apply a second layer of at least one functional and/or coloured and/or colourless/translucent/transparent particle onto the first layer of at least one polymerised viscoelastic polymer fluid that is already present on the timepiece component 10, according to said at least one executed control command. This second layer can comprise a functional ink and/or a coloured ink and/or a colourless/translucent/transparent ink having said at least one corresponding particle carried by a viscoelastic polymer fluid; in this context, these inks are also referred to as a functional viscoelastic polymer ink, a coloured viscoelastic polymer ink and a colourless/translucent/transparent viscoelastic polymer ink. This second layer and thus the one or more particles constituting same, is then subjected to polymerisation during the treatment sub-step 29. These first and second layers are arranged on the timepiece component 10 by being substantially superimposed or superimposed. Alternatively, the second layer can in particular be applied both to the first layer and directly to the assembly area of the surface of the timepiece component 10. In these conditions, this polymerisation allows the first layer to be fixed to the surface of the timepiece component 10 and the second layer to be fixed to the first layer or to this first layer as well as to the assembly area of the surface of the timepiece component 10 according to the corresponding alternative embodiments.

It should be noted that the layer of at least one particle applied onto the timepiece component 10 can have a thickness that lies in the range 10 to 150 microns, and is preferably equal to 100 microns.

It should be noted that a layer of at least one particle is understood to mean a layer that is deposited on the assembly area of the surface of the timepiece component 10 provided for this purpose, in a selective or continuous manner, and which can be subjected to a fixing phase by exposure to light radiation or to an airflow. In the context of the invention, a layer can have a constant thickness at all points or an uneven thickness that is obtained by the deposition of a variable number of droplets of at least one ink by at least one inkjet printhead 12a to 12f as a function of the position of this head 12a to 12f relative to the timepiece component 10, by at least a single pass of said at least one printhead 12a to 12f over the assembly area of the surface of the timepiece component 10 where the three-dimensional element 20 must be built. It should be noted that each droplet comprises at least one particle.

Figure 4:
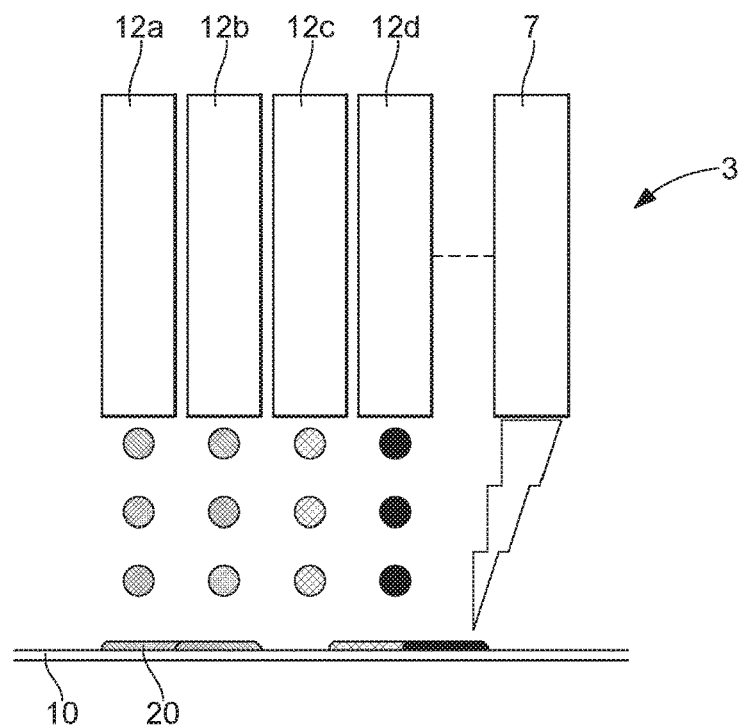
FIGS. 4, 5A and 5B show diagrammatic views of a printing device of the system, according to the embodiment of the invention.

In FIG. 4, the printing device 3, and in particular the printing member 6 thereof, comprises, for example, four cartridges provided with printheads 12a, 12b, 12c, 12d. Each of these cartridges contains a viscoelastic polymer ink, in this case, for example, coloured viscoelastic polymer ink comprising at least one pigmented particle or coloured particle allowing the cyan, magenta, yellow or black colour to be reproduced. In this context, during the construction step 27, the printing member 6 is thus controlled by the control unit 2 so as to apply/deposit the first layer of at least one coloured particle in a continuous or selective manner onto the assembly area of the surface of the timepiece component 10. This layer thus has one or more colours corresponding to the colour or to the colours of the corresponding layer of the reference three-dimensional graphical representation 9a. Ink droplets of the cyan, magenta, yellow and/or black colours are ejected from nozzles of the printheads 12a, 12b, 12c, 12d towards the assembly area of the timepiece component 10. The distance or the positioning of each printhead 12a to 12d relative to this assembly area can be adjusted according to needs, for example as a function of the contour accuracy and raised portions of the layers forming the reference three-dimensional graphical representation 9a. The number of droplets can also vary per passage or as a function of the resolution. The droplet deposited on the surface of the timepiece component 10 spreads to a greater or lesser extent as a function of the surface finish of the timepiece component 10 of the timepiece 30 before being polymerised by ultraviolet UV radiation emitted by the module capable of emitting ultraviolet UV radiation. The second layer of at least one particle is subsequently applied to the first polymerised layer before, in turn, undergoing polymerisation by application of the ultraviolet UV radiation and thus finalising the reproduction of the three-dimensional element 20 on the timepiece component 10. The superimposition of the first and second layers of at least one polymerised viscoelastic polymer fluid forms a thickness of at least 20 to 200 microns, and preferably of at least 100 microns in order to reproduce a raised print visible to the naked eye of the individual wearing a timepiece 30 having a timepiece component 10 produced according to the method of the invention.

It should be noted that, for productions of three-dimensional elements 20 having a higher raised height, a number of layers of at least one particle that lies in the range three to ten layers, preferably four or five layers, must be built on the timepiece component 10 in a superimposed or substantially superimposed manner. Each layer is subjected to the treatment sub-step 29 and in particular the fixing phase by polymerisation of each layer via ultraviolet UV radiation before superimposing an additional layer of at least one particle on the previous polymerised or printed layer.

The rapidity of the step 29 of treating each layer, in the order of less than one second, allows reference three-dimensional graphical representations 9a to be reproduced in a very short period of time compared to the methods of the prior art.

Figure 5A:
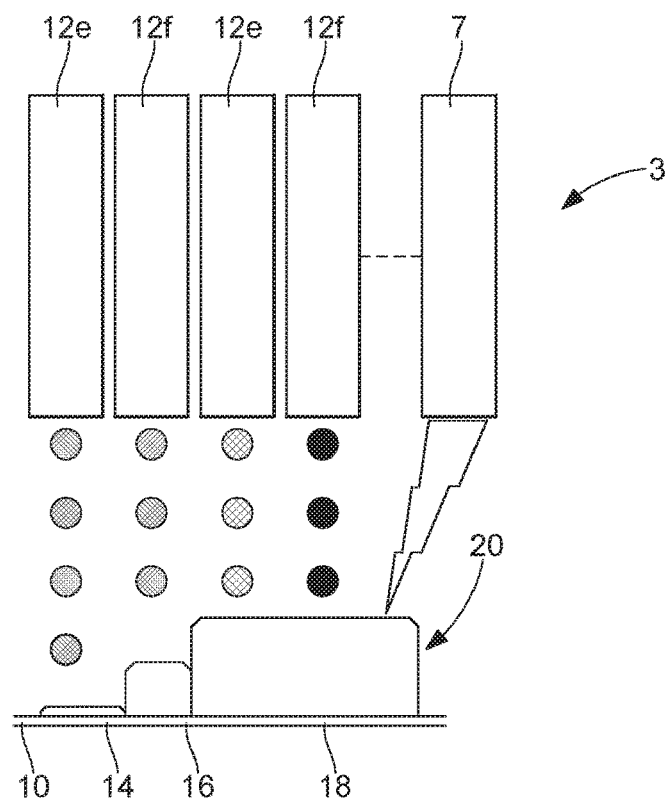
Figure 5B:
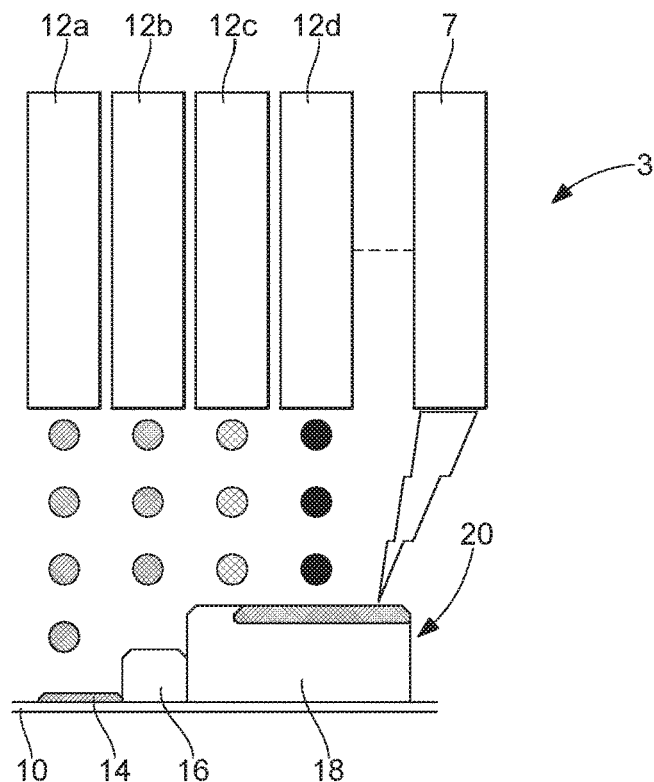

In FIG. 5A, 5B, the printing devices 3, and in particular the printing member 6 thereof, comprise, for example, four cartridges provided with printheads 12a, 12b, 12c, 12d. In the printing device 3 shown in FIG. 5A, the printing member 6 thereof comprises four cartridges provided with the printheads 12a, 12b, 12c, 12d. Each of these cartridges contains a viscoelastic polymer ink, in this case, for example, coloured viscoelastic polymer ink comprising at least one pigmented or coloured particle allowing the cyan, magenta, yellow or black colour to be reproduced.

In this context, during the construction step 27, the printing member 6 is thus controlled by the control unit 2 so as to form a three-dimensional element 20 that is thus raised on the timepiece component 10 of the timepiece 30, by the superimposition of:

a plurality of layers of viscoelastic polymer ink comprising at least one white-coloured particle and of colourless/transparent/translucent viscoelastic polymer ink comprising at least one colourless/transparent/translucent particle from the printing device 3 shown in FIG. 5A, and a plurality of layers of coloured viscoelastic polymer ink comprising at least one coloured particle from the printing device 3 shown in FIG. 5B.

It should be noted that the use of lacquer in particular allows the three-dimensional element 20 to be constructed, as does the white-coloured polymer ink.

The shape of the three-dimensional element 20 is formed by different parts 14, 16, 18 of different heights. The shape of these different parts is diagrammatically shown in FIGS. 5A and 5B. In this context, the number of layers of at least one particle included in these viscoelastic polymer inks lies, for example, in the range three to ten layers, preferably three, four or five layers can be superimposed for constructions of the three-dimensional element 20 having a large thickness. Each layer is polymerised immediately after completion of the building thereof by ultraviolet UV radiation, in particular before the superimposition of an additional layer of at least one particle on this now polymerised or printed layer.

Once the shape of the reference three-dimensional graphical representation 9a has been reproduced, the raised portion of the three-dimensional element 20 and, where appropriate, all or part of the two-dimensional timepiece component 10 can then be coated in a finalisation layer of one or more colours in order to reproduce the one or more colours of the reference digital graphical representation 9a. This finalisation layer comprises at least one particle and has a thickness that varies from 10 to 100 microns, generally as a function of the number of inks and/or lacquer forming same. This finalisation layer is then polymerised by ultraviolet UV radiation.

Figure 6A:
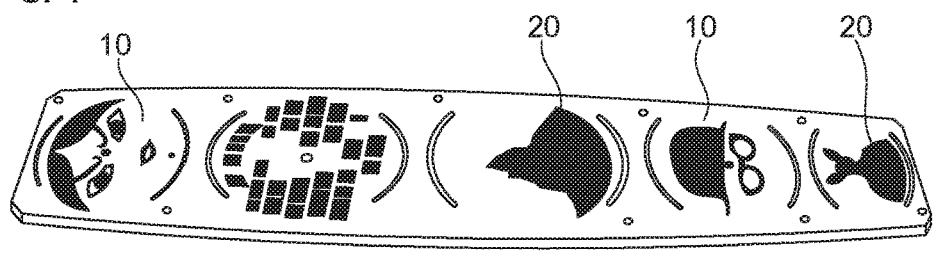
FIG. 6A shows a view of one example of a plurality of dials of a timepiece after a first step of constructing a layer of at least one printed particle, according to the embodiment of the invention.
Figure 6B:
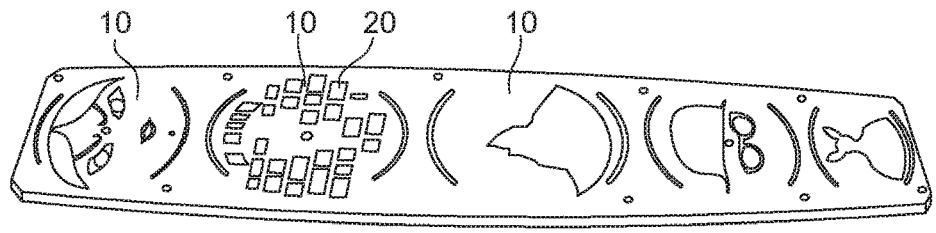
FIG. 6B shows a similar view to that in FIG. 6A after a second step of constructing a layer of at least one printed particle, according to the embodiment of the invention.
Figure 6C:
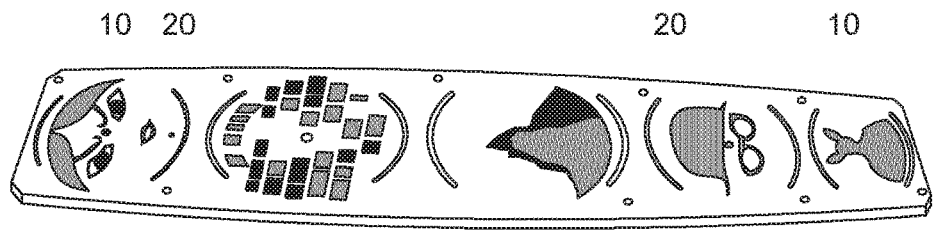
FIG. 6C shows a similar view to that in FIG. 6B after a third step of constructing a layer of at least one printed particle, according to the embodiment of the invention.

In FIG. 6A to 6C, the three-dimensional element 20 is made, in colour, on a timepiece component 10 of the timepiece 30 by applying a plurality of layers of at least one black-coloured particle, said at least one particle being included in a black-coloured viscoelastic polymer ink, and then by polymerisation of each of these layers. A black-coloured three-dimensional element 20 shown in FIG. 6A is thus obtained. With reference to FIG. 6B, this three-dimensional element 20 in addition to the remaining planar parts of the timepiece component 10 are then coated in at least one layer of at least one white-coloured particle, said particle being included in a white-coloured viscoelastic polymer ink, preferably in two white-coloured layers, each layer then being polymerised. Layers of at least one particle included in a coloured viscoelastic polymer ink are subsequently applied before also being polymerised, either on the three-dimensional element 20 only, on the planar parts of the timepiece component 10, or on the three-dimensional element 20 and these planar parts of the timepiece component 10. It should be noted that a layer of at least one particle included in lacquer can then be selectively applied or applied onto the entirety of the timepiece component 10 for a matt or gloss finish.

The invention further relates to a computer program comprising program code instructions for executing the steps of this method when said program is executed by a control unit 2.

Although the method according to the invention is illustrated by the production of a three-dimensional element 20 on a timepiece component 10 such as a dial of a timepiece 30, this method is applicable to other timepiece components, in particular to a bezel, a case, a case back, an oscillating weight, a disc, a crystal or even a bracelet. On the other hand, the implementation of such a method does not limit the production of such a three-dimensional element 20 solely to two layers, each having at least one particle, and can provide for the construction of a number of layers that far exceeds two for such a production of a three-dimensional element 20.

The invention claimed is:

1. A method for producing a three-dimensional element on a timepiece component, the method comprising:
generating, by means of a control unit, at least one control instruction for a printing device for reproducing a reference digital graphical representation relating to said three-dimensional element; and
constructing, by means of the printing device, at least two superimposed layers each comprising at least one particle which is printed on the timepiece component and which forms the three-dimensional element,
wherein the construction step includes, for each layer of at least one printed particle, a first sub-step of applying a layer of at least one particle on the timepiece component, and a second sub-step subsequent to the first sub-step, of treating said layer of at least one particle of the first sub-step.

2. The method according to claim 1, wherein the application first sub-step provides for having the control unit execute said at least one control command comprising data describing layers constituting said reference digital graphical representation to be reproduced.

3. The method according to claim 1, wherein the application first sub-step provides for depositing at least one ink comprising said at least one particle.

4. The method according to claim 1, wherein an ink comprises a fluid carrying said at least one particle, the fluid being chosen from among a solvent, a viscoelastic polymer, an oil, water and/or an aqueous solution.

5. The method according to claim 1, wherein the second sub-step of treating the layer of at least one particle comprises a phase of fixing said layer of at least one functional particle on the timepiece component.

6. The method according to claim 1, wherein a fixing phase provides for exposing the layer of at least one particle to an airflow, in particular a hot airflow and/or to light radiation, in particular ultraviolet radiation or infrared radiation.

7. The method according to claim 1, wherein at least one particle is included in an ink such as:
a colored ink comprising at least one pigmented or colored particle, or
a colorless or transparent or translucent ink comprising at least one colorless or transparent or translucent particle, or
a functional ink comprising at least one functional particle.

8. The method according to claim 1, wherein the treatment second sub-step contributes to obtaining the three-dimensional element on a timepiece component formed of at least two layers, each having at least one substantially superimposed or superimposed printed particle.

9. The method according to claim 1, wherein the three-dimensional element produced has a thickness of greater than or substantially greater than 100 microns.

10. The method according to claim 1, wherein the construction step is a construction step implementing a particle jet.

11. The timepiece component, in particular a dial, comprising at least one three-dimensional element capable of being obtained by the method according to claim 1.

12. The timepiece comprising at least one timepiece component according to claim 11.

13. A system for producing a three-dimensional element on a timepiece component implementing the method according to claim 1, the system comprising a printing device and a control unit, said printing device being connected to said control unit.

14. The system according to claim 13, wherein the control unit comprises hardware and software resources, said hardware resources comprising memory elements having at least one reference three-dimensional graphical representation to be produced on a timepiece component and descriptive data relating to said at least one reference three-dimensional graphical representation.

15. A computer program product comprising program code instructions for executing the steps of the method according to claim 1, when said program is executed by a control unit.

* * * * *